(12) United States Patent
Basey

(10) Patent No.: US 7,077,548 B2
(45) Date of Patent: Jul. 18, 2006

(54) COMPLIANT COUPLING MEMBER FOR PROJECTION DEVICE LAMP ASSEMBLY

(75) Inventor: Gary Dennis Basey, Santa Rosa, CA (US)

(73) Assignee: Infocus Corporation, Wilsonville, OR (US)

( * ) Notice: Subject to any disclaimer, the term of this patent is extended or adjusted under 35 U.S.C. 154(b) by 66 days.

(21) Appl. No.: 10/859,872

(22) Filed: Jun. 2, 2004

(65) Prior Publication Data

US 2004/0240216 A1    Dec. 2, 2004

Related U.S. Application Data

(60) Provisional application No. 60/475,366, filed on Jun. 2, 2003.

(51) Int. Cl.
*F21V 15/04* (2006.01)

(52) U.S. Cl. ............... 362/390; 362/369; 353/119

(58) Field of Classification Search ........... 362/548, 362/549, 369, 390, 546, 226, 294, 257, 362, 362/368, 373, 382, 396, 306, 288; 353/97, 353/119, 122, 74; 313/50, 49
See application file for complete search history.

(56) References Cited

U.S. PATENT DOCUMENTS

| | | | | |
|---|---|---|---|---|
| 2,800,578 A | * | 7/1957 | Falge | 362/369 |
| 3,314,331 A | * | 4/1967 | Wiley | 362/296 |
| 3,582,641 A | * | 6/1971 | Choquette | 362/369 |
| 3,621,235 A | * | 11/1971 | Appleton et al. | 362/390 |
| 3,761,170 A | * | 9/1973 | Genesky et al. | 353/87 |
| 4,156,901 A | * | 5/1979 | Haraden et al. | 362/296 |
| 4,388,679 A | * | 6/1983 | Blaisdell et al. | 362/306 |
| 4,739,396 A | | 4/1988 | Hyatt | |
| 5,029,057 A | * | 7/1991 | Devir et al. | 362/548 |
| 5,215,371 A | * | 6/1993 | Pileski | 362/390 |
| 5,707,143 A | * | 1/1998 | Hentz | 362/365 |
| 6,056,405 A | * | 5/2000 | Heintz et al. | 353/85 |
| 6,345,904 B1 | * | 2/2002 | Lu et al. | 362/368 |
| 6,461,025 B1 | * | 10/2002 | Payne | 362/374 |
| 6,502,973 B1 | * | 1/2003 | Lam | 362/369 |
| 6,508,556 B1 | * | 1/2003 | Ueda | 353/74 |
| 6,637,895 B1 | | 10/2003 | Fujimori et al. | |
| 6,905,232 B1 | * | 6/2005 | Lin | 362/369 |
| 2003/0016541 A1 | * | 1/2003 | Kisiel | 362/390 |

* cited by examiner

*Primary Examiner*—Thomas M. Sember
*Assistant Examiner*—Ismael Negron
(74) *Attorney, Agent, or Firm*—Alleman Hall McCoy Russell & Tuttle LLP

(57) ABSTRACT

An assembly for a projector include a lamp having a base portion, a lamp mount coupled to the lamp, and a unitary compliant member. The unitary compliant member may be coupled between the lamp mount and the lamp with substantially evenly spaced points of contact about the base portion of the lamp. The unitary compliant member supplies an axial force through a center of mass of the lamp to couple the lamp to the lamp mount.

19 Claims, 4 Drawing Sheets

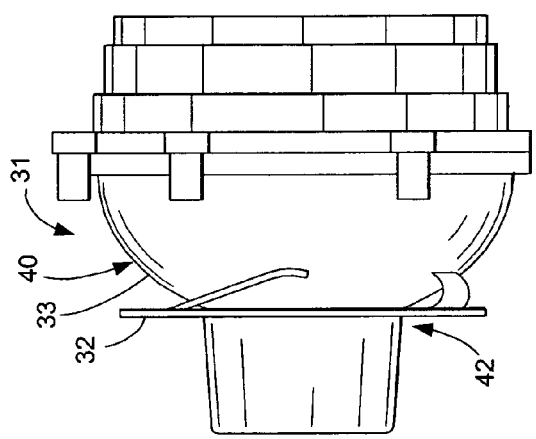
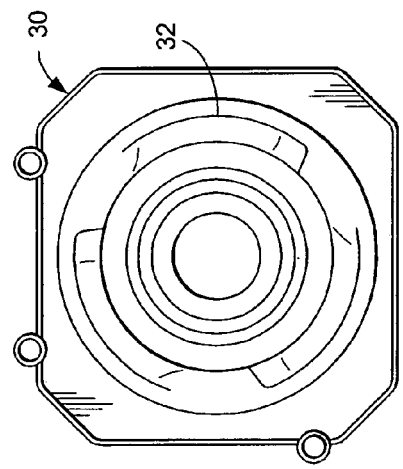
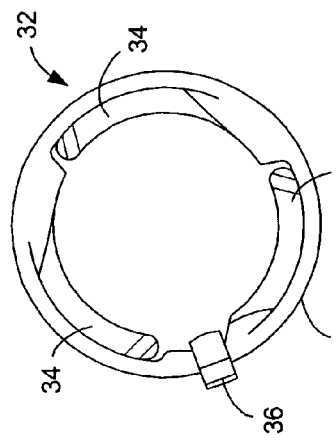
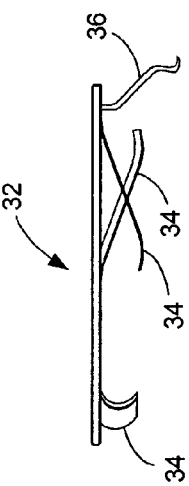
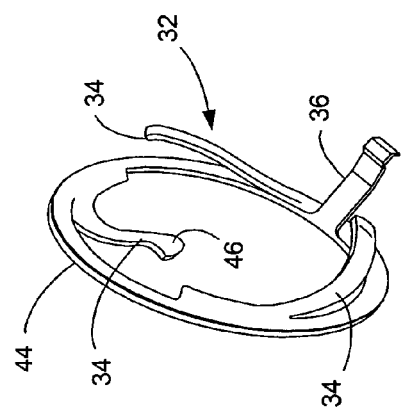
FIG. 2
FIG. 3
FIG. 4
FIG. 5
FIG. 6

COMPLIANT COUPLING MEMBER FOR PROJECTION DEVICE LAMP ASSEMBLY

CROSS-REFERENCE TO RELATED APPLICATIONS

The present application claims priority under 35 U.S.C. § 119 to U.S. Provisional Patent Application Ser. No. 60/475,366, which was filed on Jun. 2, 2003. The disclosure of that application is hereby incorporated by reference in its entirety for all purposes.

TECHNICAL FIELD

The present disclosure relates generally to lamp assemblies, and more specifically to a lamp assembly for a projection device.

BRIEF DESCRIPTION OF THE DRAWINGS

The disclosure is illustrated by way of example and not by way of limitation in the figures of the accompanying drawings, in which the like references indicate similar elements and in which:

FIG. 2 is an overhead view of a first embodiment of a lamp mount including a lamp spring suitable for use with the embodiment of FIG. 1.

FIG. 3 is a side view of the lamp spring of FIG. 2, positioned around a lamp.

FIG. 4 is a perspective view of the lamp spring of the embodiment of FIG. 2

FIG. 5 is a side view of the lamp spring of the embodiment of FIG. 2.

FIG. 6 is a top view of the lamp spring of the embodiment of FIG. 2.

DETAILED DESCRIPTION

Projection devices may be used to project or display an image. Typically, projection devices include a lamp assembly, having a lamp or other light source, linked to a light engine or optical engine. Light may be directed from the light source through the light engine to a display surface. The lamp assembly typically includes a lamp mount configured to hold the lamp in a desired position and location within the projector.

In embodiments described below, a single unitary spring is provided to retain and position the lamp within the lamp mount. Such spring may include a body generally shaped as a ring, with one or more fingers that may operate substantially uniformly to retain the lamp within the lamp mount. Such a design may offer improvements over some prior lamp assemblies, in which coil springs or other similar springs are positioned on the four corners of the lamp. In these prior assemblies, each spring may push with a different biasing force onto each corner of the lamp, which may cause the lamp to be biased or tilted relative to the lamp mount. Moreover, individual coil springs may be difficult to position on the lamp and lamp mount. Further, different coil springs may vary in spring force.

Figure 1:
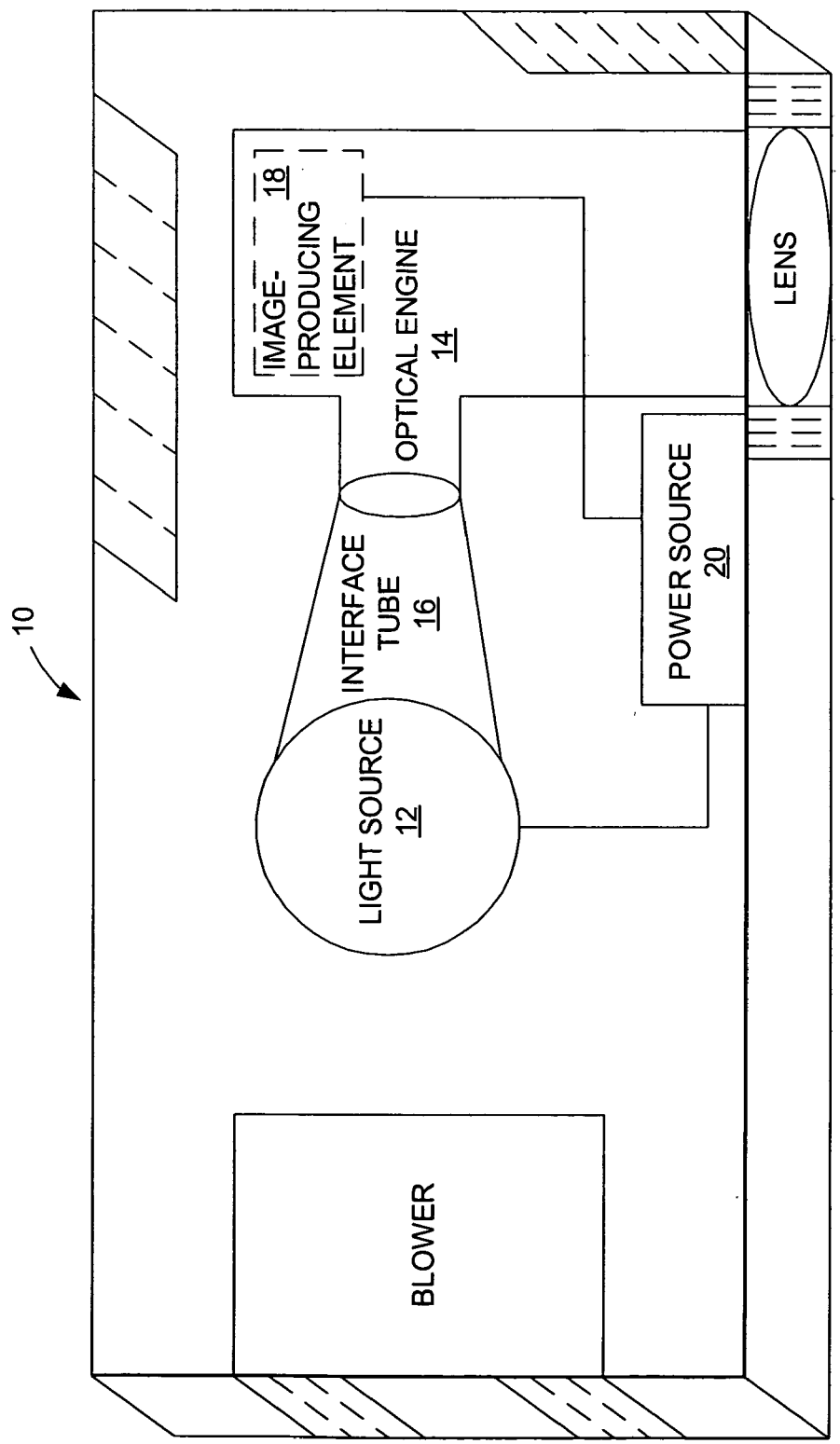
FIG. 1 is a schematic illustration of an exemplary embodiment of a projection device.

Referring now specifically to FIG. 1, a projection device 10 is illustrated. The projection device 10 may be adapted to project an image on a display surface, including, but not limited to, a screen, a wall, or other viewing surface or area.

In some embodiments, the projection device 10 may be a projector or other image-generating device that is able to project an image onto a display surface. As used herein, a projection device or image-generating device may include any suitable display device or image projector, including, but not limited to, a digital projector, a liquid crystal display (LCD) projector, a digital light processing projector, etc.

In its most basic form, the projection device 10 includes a light source (for example, a lamp) 12 and an optical engine (or light engine) 14. The light source 12 may be adapted to produce a beam of light and project the light towards the optical engine 14, which may be configured to generate an image. The light source 12 typically includes a lamp positioned within a reflector that is configured to direct most of the emitted light along the optical path of the system. The light source 12 may include any suitable type of lamp. Examples include, but are not limited to, metal halide lamps, ultra-high-pressure (UHP) arc lamps, etc. The system may also include one or more filters, such as an infrared (IR) or ultraviolet (UV) filter, to filter out unwanted parts of the emission spectra of the lamp.

Light produced from the light source 12 may be channeled along an optical path through an interface tube or spacer 16 to the optical engine 14. The optical engine 14 may include filters, color wheels, lenses, mirrors, integrators, condensers, and other optical elements.

Typically, the optical engine 14 may include an image-producing element 18 and other optics. The image-producing element 18 may include any suitable image-generation device, including, but not limited to, a digital micromirror (DMD), an LCD panel, or any other suitable image source. Image-producing element 18 may be configured to project light toward one or more mirrors or other optics, which, in turn, may be configured to reflect light toward a display surface.

The projection device 10 also may include one or more power sources 20. The power source 20 may be linked to the light source 12, the image-producing element 18, and other components of the projection device.

As described above, the light source 12 typically includes a lamp positioned within a lamp mount. FIG. 2 shows a top view of an exemplary lamp mount 30, and FIG. 3 shows a side view of an exemplary lamp 31.

The position of the lamp 31 within the lamp mount 30 may affect the operation of the device 10. For example, the lamp 31 may be subject to shock loading and vibration when the device is transported or otherwise handled. The lamp 31 may need to be sufficiently retained within the lamp mount 30 to enable the lamp 31 to substantially return to its original functional position after a shock to the device 10. Typically, the lamp mount 30 further may be configured to accommodate thermal expansion.

FIGS. 2–6 illustrate a lamp spring 32 that may be used to position and retain the lamp 31 within the lamp mount 30. Lamp spring 32 may also be referred to as a biasing member or compliant member. As described in more detail below, the lamp spring 32 may be configured to provide an axial force on the lamp 31, where the axial force extends through the center of mass of the lamp 31. The lamp spring 32 may be adapted to retain the lamp in position, and return the lamp to an original position after shocks or other vibrations. The lamp spring 32 may further accommodate thermal expansion of the lamp. Although an exemplary lamp spring 32 is illustrated, it should be appreciated that other biasing structures may be used to retain the lamp and provide a centralized axial force on the lamp 31. In one example, the lamp spring 32 includes appendages or members that act as springs, as described in more detail below.

The lamp spring 32 may be of any suitable shape to evenly retain the lamp 31 within the lamp mount 30. For example, as shown in FIG. 2, the lamp spring 32 may include a unitary ring-shaped outer portion 44 that may extend around the base portion 40 of the lamp 31 (as shown in FIG. 3). It should be appreciated that the lamp spring 32 may be of a different configuration, for example, the lamp spring 32 may include one or more rings or partial rings adapted to evenly retain the lamp within the lamp mount.

As shown in FIG. 3, the base portion 40 of lamp 31 may have a curved profile 33 that may be partially conically shaped. Further, base portion 40 of lamp 31 may include a region 42 where the profile has a bend that may be used for positioning and partially retaining lamp spring 32.

The lamp spring 32 may include one or more fingers or appendages, such as three circular fingers 34, and fourth finger 36, as shown in FIGS. 4–6. Fingers 34 may function as leaf springs or other biasing retention members. Thus, as shown in FIG. 4, three fingers 34 may extend outward in a common direction from the body of the lamp spring, which may be adapted to engage the rear of the lamp. Also as shown in FIG. 4, the fingers 34 may be evenly spaced. It should be appreciated that although three fingers 34 are illustrated, one, two, three, four, or more fingers may extend from the body of the lamp spring. The fingers 34 may contact the base 40 of the lamp 31 (as shown in FIG. 3) when the lamp 31 is positioned in the lamp mount 30. In some embodiments, a fourth finger 36 may extend outward and engage the lamp and bias the lamp toward the lamp mount 30.

Thus, in some embodiments, a 6-axis control system may be used to position the spring relative the lamp. Specifically, in a 6-axis control system, six datum points located on throe datum surfaces may be used. For example, a primary datum plane A, a secondary datum plane B, and a tertiary datum plane C may be disposed at right angles and form three sides of a box. The A datum may be contacted by three points of the corresponding surface on the part to be positioned. Three points determine a plane, so that the three points of the surface position the part so that it can only slide along the A datum. From here, the degrees of freedom of the part are similar to those for a two dimensional part: one rotational and two translational. As with the two-dimensional part, the next datum will contact the two high points of the B surface: Now the part can slide along the A datum and B datum in a direction perpendicular to the C datum. As with the two-dimensional case, one high point of contact with C completes the location of the part in space with respect to the datum.

In the case of the lamp, three points are provided for the face of the lamp to rest against a datum plane, A. Two points are provided for the side forming datum plane B, and one point for the final side, datum plane C. The three circular fingers 34 of the spring push the face of the lamp evenly against the three points of datum -A-. The side or fourth finger 36 of the spring pushes against the side of the lamp at a specific angle and force to bias the lamp against both the B and C datum. Fourth finger 36 may push against the lamp at any suitable angle. It should be appreciated that the angle against the lamp may vary depending on the shape of the lamp, the position of the spring, the angle of bias of the other fingers, etc.

It also should be noted that in some embodiments, the lamp spring 32, as shown in FIGS. 4–6, may have a relatively thin thickness relative to the width of the ring and/or fingers 34, 36. Further, as shown in FIGS. 4–6, the outer portion 44 of the lamp spring 32 may be circular or curved in shape, along with fingers 34. In one example, the curvatures of the fingers 34 and outer portion 44 of the lamp spring 32 are substantially the same due to their unitary structure. Further, as shown in FIGS. 4–6, fingers 34 may have a flattened portion 46 which may be adapted to engage base 40 of lamp 31.

The lamp spring 32 may be configured to retain and maintain the position of the lamp 31 within the lamp housing 30. For example, the lamp spring 32 may push the lamp through the center of its mass providing a force concentric to the centerline of the lamp 31 via the axial loading of the lamp 31 by the fingers 34 and/or finger 36.

The lamp spring 32, including the fingers 34 and 36, may be formed and heat-treated at the same time, and may be formed from common stock material. Such manufacturing may reduce variation between the spring forces of each of the fingers 34, 36 and may reduce process variance between them.

Figure 7:
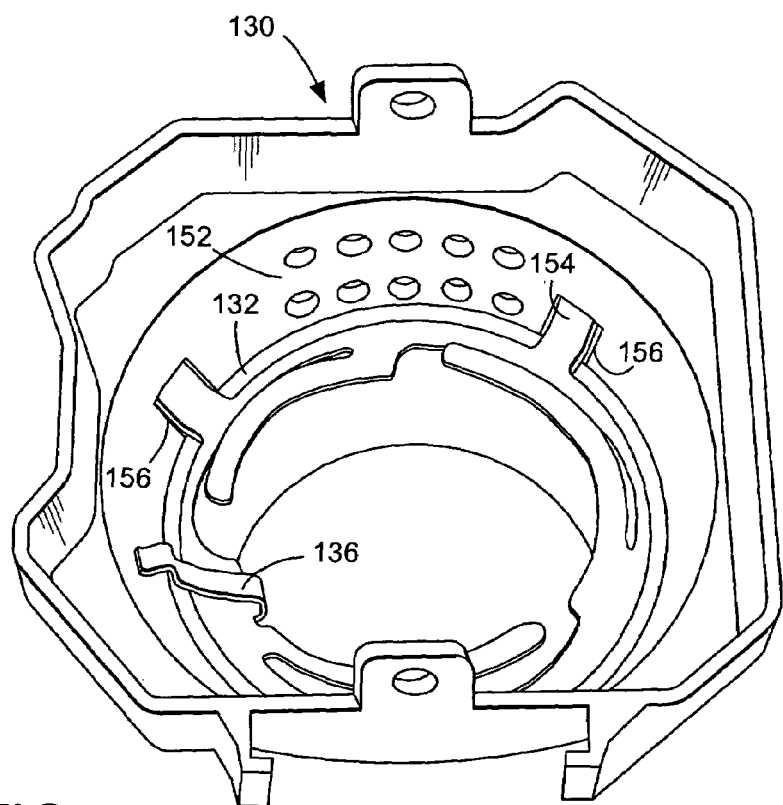
FIG. 7 is an isometric view of another embodiment of a lamp mount including a lamp spring.
Figure 8:
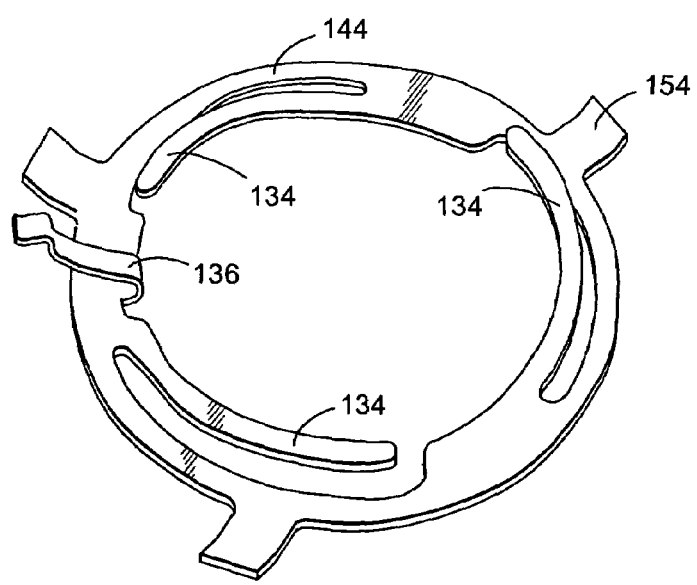
FIG. 8 is an isometric view of the lamp spring of the embodiment of FIG. 7.
Figure 9:
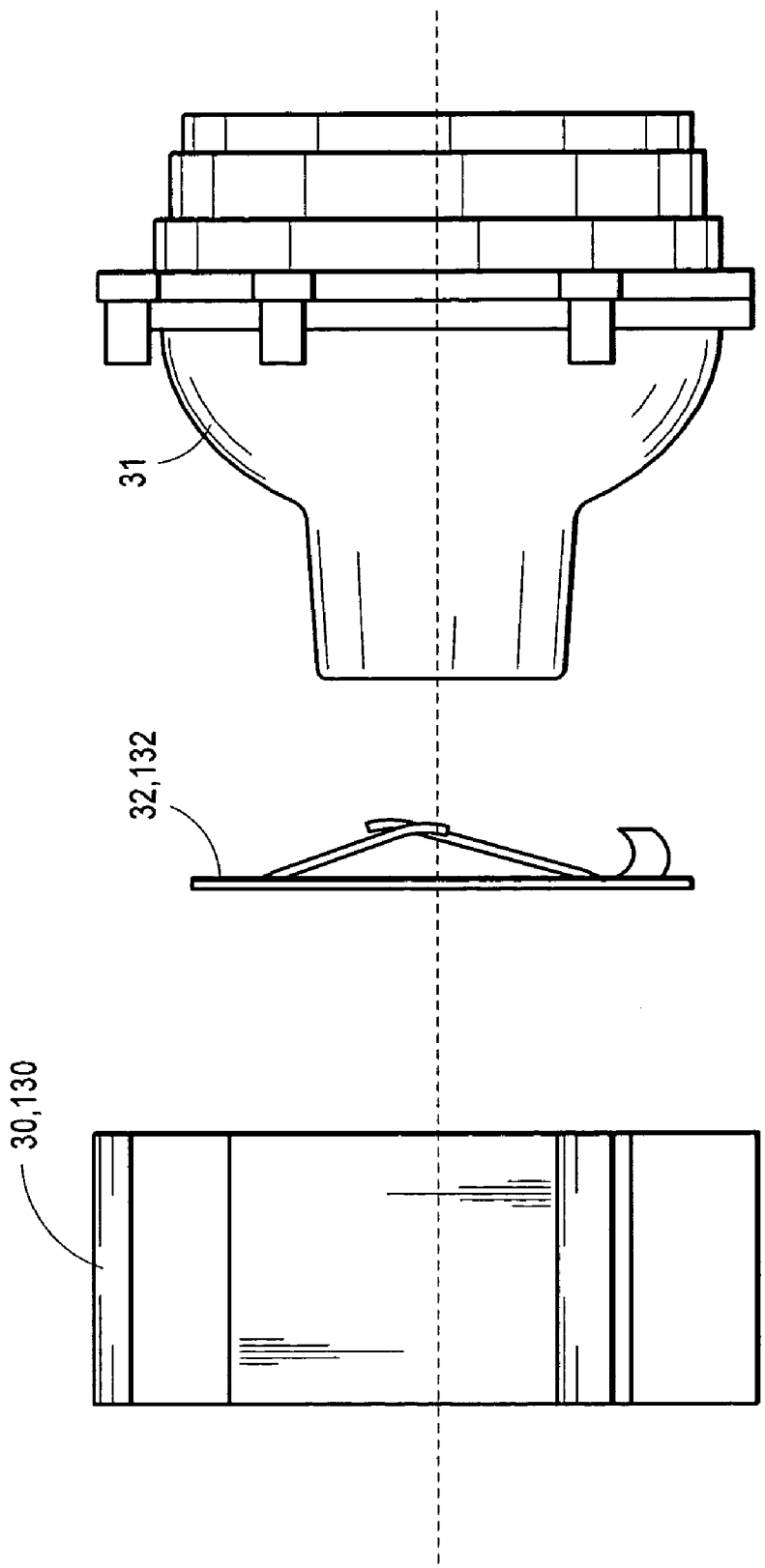
FIG. 9 is an exploded view of a lamp mount showing the relative position of a lamp and a lamp spring according to an embodiment of the present disclosure.

FIGS. 7 and 8 are three-dimensional renderings of another exemplary embodiment of lamp spring 132 and lamp mount 130. It should be appreciated that such drawings are for illustrative purposes only and are not intended to be limiting. In the example shown in FIG. 7 where the lamp mount 130 is shown adjacent to lamp spring 132, lamp mount 130 includes a plurality of holes 152 for heat dissipation and/or air circulation. In the example of FIG. 7, two rows of five holes 152 are utilized to allow sufficient air movement, while retaining structural integrity of the lamp mount 130. Also, in the example shown in FIG. 8, three protrusions 154 are shown extending outward from the outer portion 144 of lamp spring 132, which may be used to position and/or align lamp spring 132 to lamp mount 130. The protrusions 154 may also be configured to engage complementary recesses 156 in lamp mount to hold the lamp spring 132 within the lamp mount 130. FIG. 8 also shows that lamp spring 132 may include fingers 134 and 136. FIG. 9 shows the relative position of the lamp mount 30, 130 (FIGS. 2 and 7), lamp 31 (FIG. 3), and the unitary complaint member 32, 132 (FIGS. 2 and 7) in a side view.

The disclosure set forth above encompasses multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein.

Applicants reserve the right to submit claims directed to certain combinations and subcombinations of the disclosed invention that are regarded as novel and nonobvious. Inventions embodied in other combinations and subcombinations of features, functions, elements, and/or properties may be claimed through amendment of the claims or through presentation of new claims in this or a related application. Such claims, whether directed to a different invention or to the same invention, and whether broader, narrower, equal, or different in scope to the original claims, also are regarded as included within the subject matter of the inventions of the present disclosure.

What is claimed is:

1. An assembly for a projector, comprising:
   a lamp having a base portion, said base portion having a curved profile;
   a lamp mount coupled to said lamp; and
   an unitary compliant member coupled between said lamp mount and said lamp with substantially evenly spaced points of contact about said base portion with said lamp for supplying an axial force through a center of mass of the lamp to couple the lamp to the lamp mount, wherein said unitary compliant member contacts said lamp on said curved profile of said base portion.

2. The assembly of claim 1, wherein said unitary compliant member is ring-shaped.

3. The assembly of claim 2, wherein said base portion is conically shaped.

4. The assembly of claim 2, wherein said unitary compliant member has a thickness less than a width.

5. An assembly for a projector, comprising:
   a lamp having a base portion;
   a lamp mount coupled to said lamp; and
   an unitary compliant member coupled between said lamp mount and said lamp with substantially evenly spaced points of contact about said base portion of said lamp for supplying an axial force through a center of mass of the lamp to couple the lamp to the lamp mount, wherein said unitary compliant member is ring-shaped and there are at least three substantially evenly spaced points of contact, said at least three evenly spaced points of contact being formed from three fingers extending from said unitary compliant member, said fingers integrally formed in said member.

6. The assembly of claim 5, wherein said at least three fingers have a flat portion adapted to engage a rear of said lamp assembly.

7. The assembly of claim 5, wherein said unitary compliant member is adapted to engage a rear of said lamp housing.

8. The assembly of claim 5, wherein said at least three fingers have a curvature substantially the same as a curvature of an outer portion of said unitary compliant member.

9. The assembly of claim 8, wherein said at least three fingers each protrude out from said unitary compliant member in a common direction.

10. An assembly for a projector, comprising:
    a lamp having a base portion;
    a lamp mount coupled to said lamp; and
    unitary means for supplying an axial force through a center of mass of said lamp to couple said lamp to said lamp housing, wherein said unitary means includes a ring-shaped unitary compliant member having at least three fingers adapted to create a spring force on said lamp mount, wherein at least three evenly spaced points of contact are formed from said three fingers extending from said unitary compliant member, said fingers integrally formed in said member.

11. The assembly of claim 10, wherein said base portion is conically shaped.

12. The assembly of claim 10, wherein said unitary compliant member has a thickness less than a width.

13. The assembly of claim 10, wherein said unitary compliant member includes a fourth finger protruding out farther than said three fingers.

14. The assembly of claim 10, wherein said unitary compliant member is heat-treated.

15. An assembly for a projector, comprising:
    a lamp including a conically-shaped base portion;
    a lamp mount coupled to said lamp; and
    a ring-shaped unitary compliant member coupled between said lamp housing and said lamp with at least three points of contact formed by at least three protruding fingers from said member, said points of contact evenly spaced about said base portion with said lamp, said fingers being curved and protruding in a common direction from said member, said fingers each having a flattened portion adapted to engage said lamp mount at said points of contact.

16. The assembly of claim 15, wherein said unitary compliant member includes a fourth finger protruding out farther than said three fingers.

17. An assembly for a projector, comprising:
    a lamp having a conical base portion;
    a lamp mount coupled to said lamp; and
    an unitary member coupled between said lamp mount and said conical portion of said lamp with compliant biasing members that form substantially evenly spaced points of contact between said compliant biasing members and said lamp, where said points of contact are evenly spaced about said lamp and where said unitary member supplies an axial force through a center of mass of the lamp to couple the lamp to the lamp mount wherein said compliant biasing members contact said lamp on said conical base portion at a narrow end of said base portion.

18. The assembly of claim 17, wherein said unitary compliant member is ring-shaped.

19. The assembly of claim 18, wherein said unitary compliant member has a thickness less than a width.

* * * * *